United States Patent
Collura et al.

(10) Patent No.: US 10,990,405 B2
(45) Date of Patent: Apr. 27, 2021

(54) CALL/RETURN STACK BRANCH TARGET PREDICTOR TO MULTIPLE NEXT SEQUENTIAL INSTRUCTION ADDRESSES

(71) Applicant: International Business Machines Corporation, Armonk, NY (US)

(72) Inventors: Adam Collura, Hopewell Junction, NY (US); James Bonanno, Wappingers Falls, NY (US); Steven J. Hnatko, Fishkill, NY (US); Brian Robert Prasky, Campbell Hall, NY (US); Daniel Lipetz, Union, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 10 days.

(21) Appl. No.: 16/279,250

(22) Filed: Feb. 19, 2019

(65) Prior Publication Data
US 2020/0264887 A1 Aug. 20, 2020

(51) Int. Cl.
*G06F 9/38* (2018.01)
*G06F 9/30* (2018.01)

(52) U.S. Cl.
CPC ........ *G06F 9/3846* (2013.01); *G06F 9/30054* (2013.01); *G06F 9/30058* (2013.01); *G06F 9/3806* (2013.01)

(58) Field of Classification Search
None
See application file for complete search history.

(56) References Cited

U.S. PATENT DOCUMENTS

| | | | |
|---|---|---|---|
| 5,313,634 A * | 5/1994 | Eickemeyer | G06F 9/30054 712/240 |
| 5,995,749 A | 11/1999 | Tran | |
| 7,024,545 B1 | 4/2006 | Zuraski, Jr. et al. | |
| 8,019,980 B2 | 9/2011 | Wang | |

(Continued)

FOREIGN PATENT DOCUMENTS

| | | |
|---|---|---|
| CN | 106155928 A | 11/2016 |
| EP | 1073949 B1 | 4/2002 |

OTHER PUBLICATIONS

James J. Bonanno, et al.,"Distance Based Branch Prediction and Detection of Potential Call and Potential Return Instructions", U.S. Appl. No. 15/165,395, filed May 26, 2016.

(Continued)

*Primary Examiner* — William B Partridge
(74) *Attorney, Agent, or Firm* — Cantor Colburn LLP; William Kinnaman (57) ABSTRACT

A computer system includes a branch detection module and a branch predictor module. The branch detection module determines that a first program branch is a possible call branch having a next sequential instruction address (NSIA), and determines that a first routine branch is a possible return capable branch having the first routine instruction address that is a detected as being offset. The branch predictor module determines that a second program branch is a possible call branch having a next sequential instruction address (NSIA), and determines that a second routine branch is a predicted return branch having a predicted target instruction address based on the NSIA of the second program branch and the predicted offset.

20 Claims, 7 Drawing Sheets

(56) References Cited

U.S. PATENT DOCUMENTS

| | | |
|---|---|---|
| 8,443,171 B2 | 5/2013 | Morris et al. |
| 2002/0174327 A1* | 11/2002 | Kruckemyer ......... G06F 9/3806 712/234 |
| 2007/0033385 A1 | 2/2007 | Smaus et al. |
| 2017/0090933 A1 | 3/2017 | Day |
| 2017/0344373 A1* | 11/2017 | Bonanno ................. G06F 9/34 |

OTHER PUBLICATIONS

James J. Bonanno, et al.,"Distance-Based Branch Prediction and Detection of Potential Call and Potential Return Instructions", U.S. Appl. No. 15/440,383, filed Feb. 23, 2017.
List of IBM Patents or Patent Applications Treated as Related; Date Filed: Feb. 20, 2019, p. 1-2.

* cited by examiner

CALL/RETURN STACK BRANCH TARGET PREDICTOR TO MULTIPLE NEXT SEQUENTIAL INSTRUCTION ADDRESSES

BACKGROUND

The present disclosure relates to branch prediction and, in particular, to distance-based branch prediction and detection.

Branch prediction attempts to identify the location of branches in an instruction stream that is being executed by a processor to improve performance. Accuracy is important to avoid costly branch wrong restart penalties. Branch prediction can predict both the direction and target instruction address of a branch. Alternatively, without branch prediction, the pipeline may have to wait for branch resolution before proceeding along the taken or not taken path.

One current solution for predicting the target instruction address is to use a branch target buffer (BTB). The BTB stores what the target instruction address was for a branch the last time the branch was encountered. This approach works well for branches whose target instruction addresses are not a function of the path taken to arrive at the branch. However, for branches whose target instruction addresses are a function of the path taken to arrive at the branch, history-based structures may be used, such as a multi-target table (MTT) (sometimes referred to as a changing target buffer (CTB)). Other target prediction solutions exist to predict return-type branch targets to the next sequential instruction after their respective call-type branch.

SUMMARY

According to examples of the present disclosure, techniques including methods, systems, and/or computer program products provide for call/return stack branch target predictions to multiple sequential instruction addresses. According to a non-limiting embodiment, a computer data processing system comprises a branch detection module configured to determine that a first program branch is a possible call branch having a next sequential instruction address (NSIA). The branch detection module further determines that a first routine branch is a possible return capable branch having a first routine instruction address that is detected as being offset within a defined range of allowed offsets from the NSIA. The computer data processing system further includes a branch predictor module configured to determine that a second program branch is a possible call branch having a NSIA, and to determine that a second routine branch is a predicted return branch having a predicted target instruction address based on the NSIA of the second program branch and the predicted offset.

According to another non-limiting embodiment, a method is provided to perform a branch prediction in a computer data processing system. The method comprises determining a first program branch is a possible call branch having a next sequential instruction address (NSIA), and determining that a first routine branch is a possible return capable branch having a first routine instruction address that is detected as being offset within a defined range of allowed offsets from the NSIA. The method further comprises determining that a second program branch is a possible call branch having a next sequential instruction address (NSIA), and determining that a second routine branch is a predicted return branch having a predicted target instruction address based on the NSIA of the second program branch and the predicted offset.

According to another non-limiting embodiment, a computer program product is provided to control an electronic device to perform a branch prediction in a computer data processing system. The computer program product comprises a computer readable storage medium having program instructions embodied therewith. The program instructions are executable by an electronic computer processor to control the electronic device to perform operations comprising determining a first program branch is a possible call branch having a next sequential instruction address (NSIA), and determining that a first routine branch is a possible return capable branch having a first routine instruction address that is detected as being offset within a defined range of allowed offsets from the NSIA. The method further comprises determining that a second program branch is a possible call branch having a next sequential instruction address (NSIA), and determining that a second routine branch is a predicted return branch having a predicted target instruction address based on the NSIA of the second program branch and the predicted offset.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

Branch prediction is a computing process which aims to find branches in an executed instruction stream in an effort to avoid costly branch wrong restart penalties. Branch prediction is typically performed by a processing unit (e.g., a branch predictor unit) that predicts both the direction and target instruction addresses (IAs) of a branch. One technique to predict the target IA is by using a branch target buffer (BTB), which stores what the target IA was for a branch the last time it was encountered. This approach works well for branches having target IA that are not a function of the path taken to reach the branch. For branches having a target address that are a function of the path taken to reach the branch, history-based structures such as a multi-target table (MTT), for example, can be employed.

Branch prediction techniques can also utilize a call-return stack (CRS) to predict the target of the branch that ends a routine. This is achieved using an instruction set that includes a call and return (call/return) instruction, which informs the branch predictor unit exactly when to "push and pop" target IAs from a stack structure.

Challenges can arise when attempting to implement call/return techniques in system architectures that do not employ well-defined CRS call/return instructions. For instance, implementing a call-return stack in hardware that is based on an instruction set architecture (ISA) that does not have call and return instructions well defined is difficult due to the cost of accurately identifying call-like and return-like instructions. Even if an ISA is enriched with call-return type instructions, the full benefit of a call-return stack may not be realized.

When implementing call/return techniques, it is necessary to ensure that the compilation of all files having associated calls and returns are all linked together and updated simultaneously to exploit the full benefit of the call/return stack. However, systems that do not employ well-defined CRS call/return instructions may be susceptible to scenarios where code is not routinely recompiled if an instruction set is enriched with new instructions, such as the case with call/return type instructions. Furthermore, systems that do not employ well-defined CRS call/return instructions may recompile only select modules of code, which leads to cases where some code has either the new call-return instruction but the module it links does not have the corresponding paired instruction. Old code implemented in systems that do not employ well-defined CRS call/return instructions also may not be capable of exploiting a new call/return stack prediction mechanism if it requires the use of the new instruction.

Furthermore, it has been discovered systems that do not employ well-defined CRS call/return instructions may sometimes include code that is written in a manner where the return address is not the next sequential instruction address (NSIA), i.e., the next address immediately following the address of the call branch function. Instead, the return address may be an offset byte from the NSIA. For instance, rather than returning to NSIA, the return address may be NSIA+2 bytes, or NSIA+4 bytes, or NSIA+6 bytes, etc. Consequently, conventional call/return stack branch target prediction systems can realize costly wrong branch penalties because they are incapable of performing prediction to multiple next sequential instruction addresses (i.e., NSIA+n, where n is >0).

Embodiments of the present teachings described herein provide for target instruction address prediction when a branch whose target instruction address is returning from a function. The present techniques enable identifying branches that exhibit call-like characteristics to determine to return IA's, and identify branches that exhibit return-like characteristics to apply accurate target IA prediction without architectural changes to the underlying code. Unlike conventional call/return stack branch target prediction systems, one or more embodiments of the present invention provide a branch predictor unit configured to perform call/return stack target branch predictions to multiple next sequential instruction addresses. Accordingly, the data processing system employing the inventive branch predictor unit can avoid costly wrong branch penalties when the return address is not the next sequential instruction addresses immediately following the call branch function.

Figure 1:
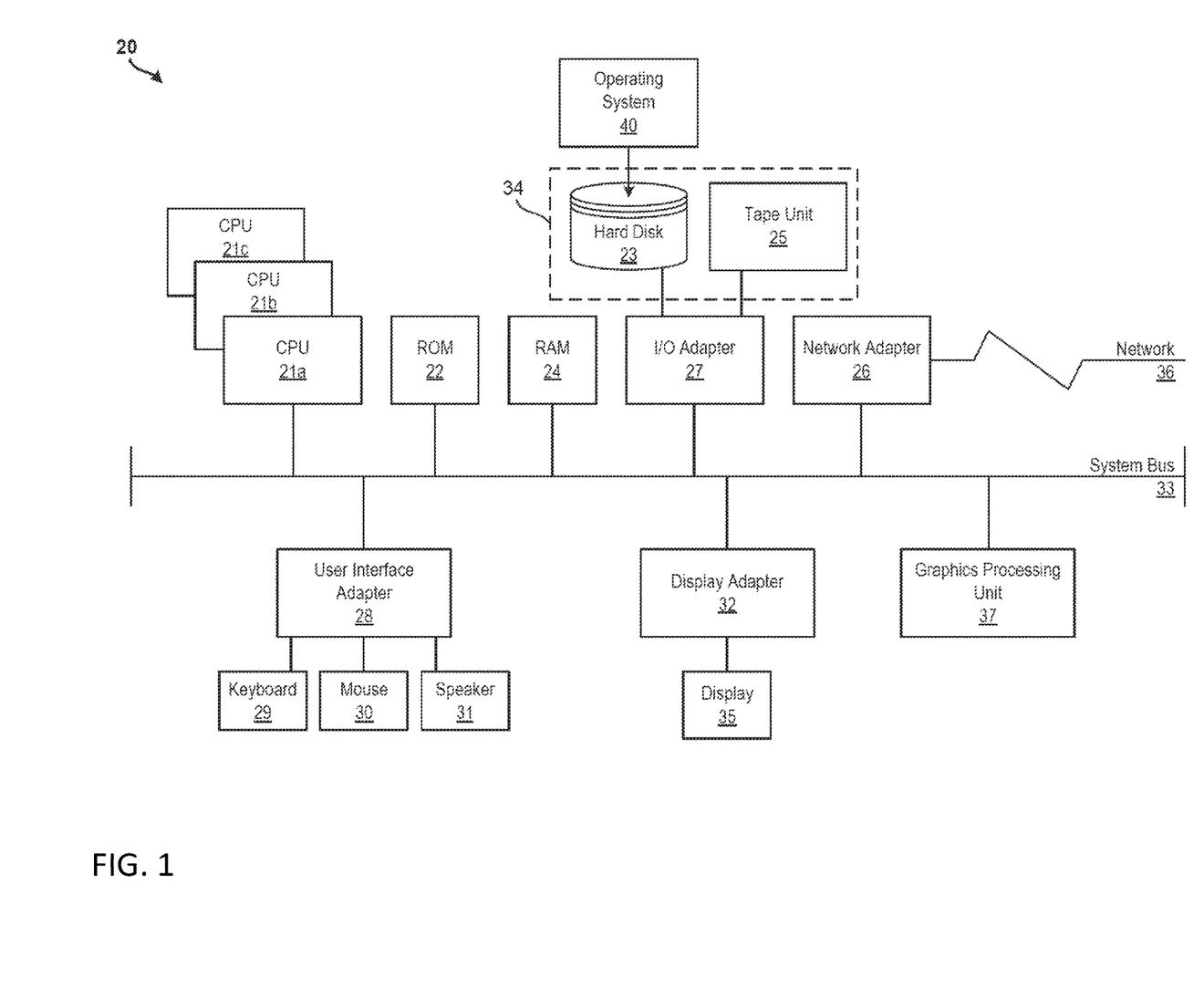
FIG. 1 is a block diagram of a processing system implementing a branch prediction and detection system according to examples of the present disclosure.

With reference now to FIG. 1, a block diagram of a processing system 20 for implementing the techniques described herein is illustrated according to a non-limiting embodiment. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super 110 chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

Figure 2:
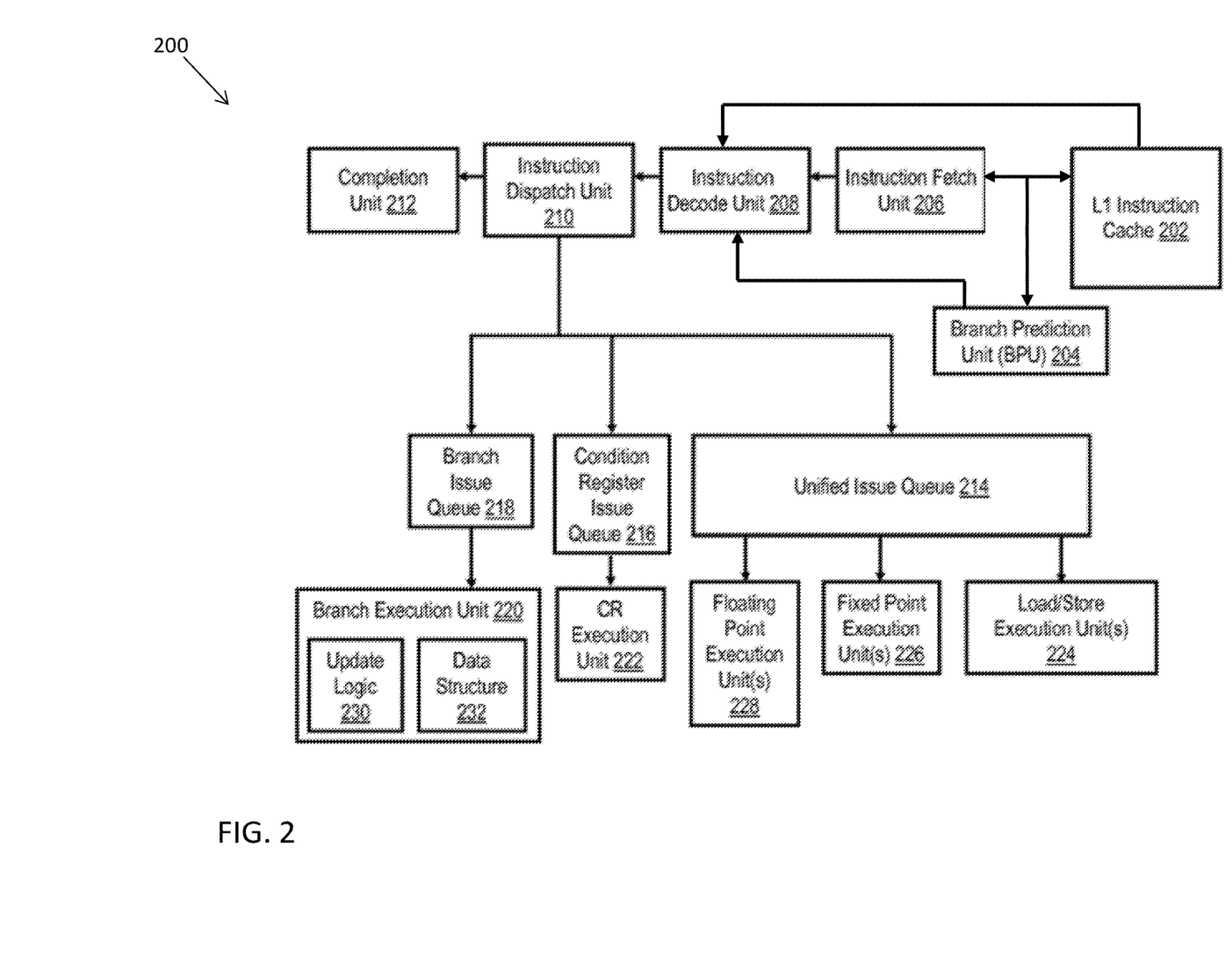
FIG. 2 is a block diagram of a branch prediction and detection system according to examples of the present disclosure.

Referring to FIG. 2, a branch prediction and detection system 200 included in the data processing system 20 is illustrated according to a non-limiting embodiment. The branch prediction and detection system 200 includes a level 1 (L1) instruction cache 202 from which instruction fetch unit (IFU) 206 fetches instructions. IFU 206 may support a multi-cycle (e.g., three-cycle) branch scan loop to facilitate scanning a fetched instruction group for branch instructions predicted 'taken', computing targets of the predicted 'taken' branches, and determining if a branch instruction is an unconditional branch or a 'taken' branch. Fetched instructions are also provided to branch prediction unit (BPU) 204, which predicts whether a branch is 'taken' or 'not taken' and a target of predicted 'taken' branches.

In one or more embodiments, BPU 204 includes a branch direction predictor (not shown in FIG. 2) that implements a local branch history table (LBHT) array, global branch history table (GBHT) array, and a global selection (GSEL) array. The LBHT, GBHT, and GSEL arrays (not shown) provide branch direction predictions for all instructions in a fetch group (that may include up to eight instructions). The LBHT, GBHT, and GSEL arrays are shared by all threads. The LBHT array may be directly indexed by bits (e.g., ten bits) from an instruction fetch address provided by an instruction address (iaddr) such as an instruction fetch address register (IFAR). The GBHT and GSEL arrays may be indexed by the instruction fetch address hashed with a global history vector (GHV).

The GHV is a 20-bit vector that tracks a "taken/not taken" history of a previous number of branches (e.g., the last 20 branches). In at least one non-limiting embodiment, "1" bit is shifted into the GHV for every taken branch while a "0" bit is shifted into the GHV for every instruction group. For example, a traditional GHV for the last 20 branches could be: "10101011110001110011". In at least one embodiment, the hash of a given GHV value is used as an index into the GBHT. Accordingly, the GBHT can be used to indicate that based on when the last time the binary bit represented by the hash was detected, whether the next branch was either taken or not taken.

The IFU 206 provides fetched instruction to instruction decode unit (IDU) 208 for decoding. IDU 208 provides decoded instructions to instruction dispatch unit 210 for dispatch. Following execution of dispatched instructions, instruction dispatch unit 210 provides the results of the executed dispatched instructions to completion unit 212. Depending on the type of instruction, a dispatched instruction is provided to branch issue queue 218, condition register (CR) issue queue 216, or unified issue queue 214 for execution in an appropriate execution unit. The branch issue queue 218 stores dispatched branch instructions for branch execution unit 220. CR issue queue 216 stores dispatched CR instructions for CR execution unit 222. Unified issued queue 214 stores instructions for floating point execution unit(s) 228, fixed point execution unit(s) 226, load/store execution unit(s) 224, among other execution units.

Figure 3:
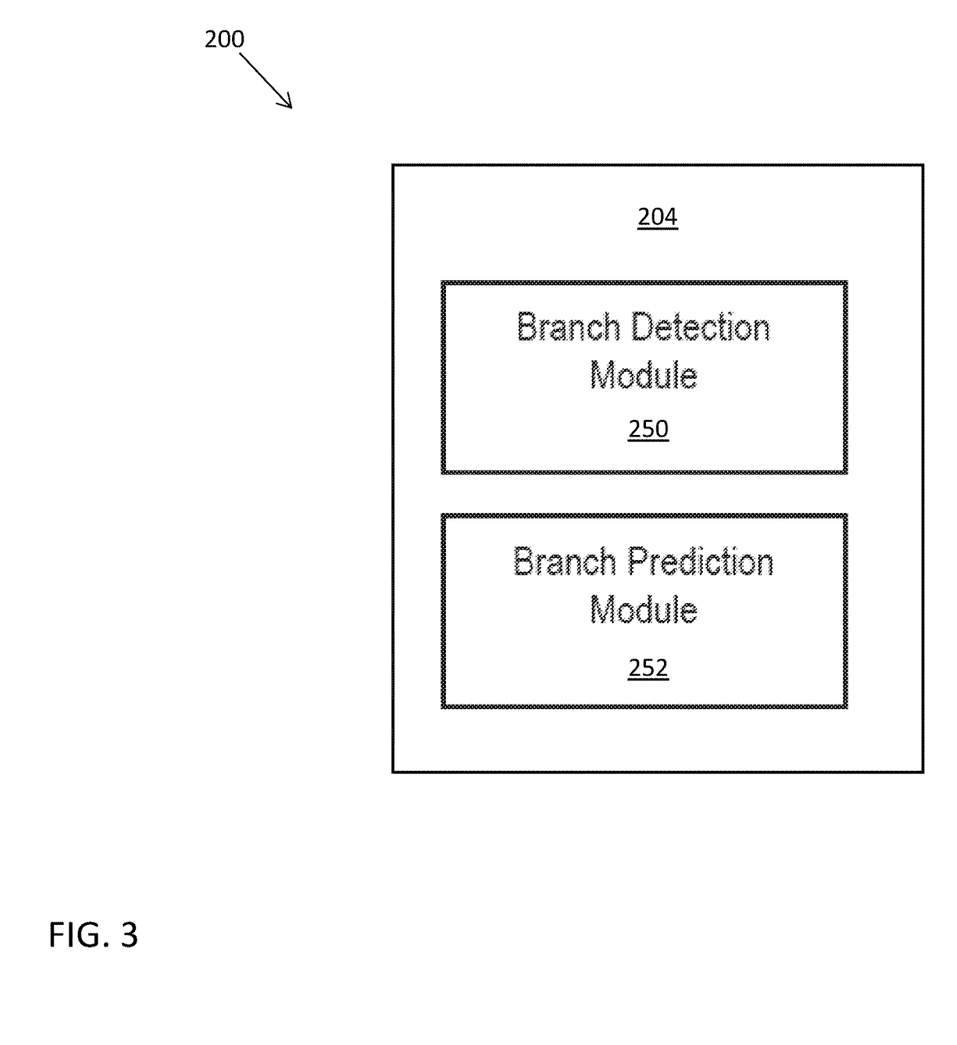
FIG. 3 is a block diagram of a data processing system including a branch predictor unit configured to perform call/return stack target branch predictions to multiple next sequential instruction addresses according to a non-limiting embodiment.

FIG. 3 illustrates a block diagram of a branch prediction unit (BPU) 204 configured to perform call/return stack target branch predictions to multiple next sequential instruction addresses according to examples of the present disclosure. The various components, modules, engines, etc. described regarding FIG. 3 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include a processing device for executing those instructions. Thus, system memory can store program instructions that when executed by processing system 20 implement the engines described herein. Other engines may also be utilized to include other features and functionality described in other examples herein.

The BPU 204 includes a branch detection module 250 and a branch prediction module 252. The branch detection module 250 and/or the branch prediction module 252 can be constructed as an electronic hardware controller that includes memory and a processor configured to execute algorithms and computer-readable program instructions stored in the memory. The branch detection module 250 performs a branch detection process to determine call-like and return-like branch instructions, for example, at completion time (i.e., past branch instruction execution time). That is, the branch detection method occurs at the point where a branch is known to be actually taken or not (i.e., a non-speculative point) as well as its correct target IA.

In at least one non-limiting embodiment, for every completed branch taken, first, a distance D between the branches' branch instruction address (IA) and its target IA are compared. The distance may be a number of bytes, halfwords, etc. This may be done as an exact or imprecise compare. If the distance is greater than a threshold (Th), the next sequential IA (NSIA) of the branch instruction is saved in a completion_NSIA side register and marked as valid as a potential call to the return point is known. Next, the target IA of each successive branch is compared with the saved and valid completion_NSIA side register. Some implementations might include the distance D comparison at this step. If the values match, a possible return type branch is indicated. The completion_NSIA side register is marked as invalid, completing the call-return pair, and the possible return is recorded in a branch prediction table. If the values do not match, a possible return type branch is not indicated. In this example implementation, only return-like branches are marked in a branch prediction table. Call-like branches can be marked too in other examples to further improve the design and implementation efficiency.

In another non-limiting embodiment, for every completed taken branch, the branch detection module 250 compares the difference between its branch instruction address (IA) and a target instruction address (IA, D). When the difference (i.e., IA-IA, D) is greater than a threshold value (Th), the branch detection module 250 saves the next sequential instruction address (NSIA) in a completion NSIA side register (not shown in FIG. 3) and marks it valid.

The branch detection module 250 then compares the target IA with the saved and valid completion NSIA side register. In one or more embodiments, the branch detection module 250 compares the target IA to all NSIA offset values (e.g., NSIA+2 NSIA+4, NSIA+6, NSIA+n). When the target IA matches a given NSIA offset value, the branch detection module 250 determines a match.

When a match exists, the branch detection module 250 determines that a possible return type branch has been found. Accordingly, the branch detection module 250 invalidates the completion NSIA side register, and records the possible return function along with its offset (e.g., 2 bits, 4 bits, etc.) in a branch prediction logic (BPL) table (not shown in FIG. 3).

For every predicted taken branch not marked a "return type" branch, the branch prediction module 252 compares a difference between its branch instruction address (IA) and a target instruction address (IA, D). When the difference (i.e., IA-IA, D) is greater than a threshold value (Th), the branch prediction module 252 saves the next sequential instruction address (NSIA) in a prediction NSIA side register (not shown in FIG. 3) and marks it valid.

For every predicted taken branch marked as a "return type" branch, the branch prediction module 252 analyzes the status of the prediction NSIA side register. When the prediction NSIA side register indicates valid, the branch prediction module 252 uses the value in the prediction NSIA side register plus the offset in the branch target buffer (BTB) as the target IA. When, however, the prediction NSIA side register indicates invalid, the branch prediction module 252 relies on existing target prediction structures. Exemplary existing target prediction structures could be a multi-target table (MTT) or a branch target buffer (BTB).

The BTB can include a multitude of metadata associated with a particular branch. In this scenario, the target address is one piece of metadata, while the return offset is another piece of metadata. In at least one non-limiting embodiment, identified returns and identified calls can be marked by setting a bit in the BTB. A detected offset can also be written into the prediction structure either with the call branch or the return branch. Accordingly, the offset can be detected from the NSIA that the return goes to, which then can be remembered in order to subsequently predict the offset.

Figure 4:
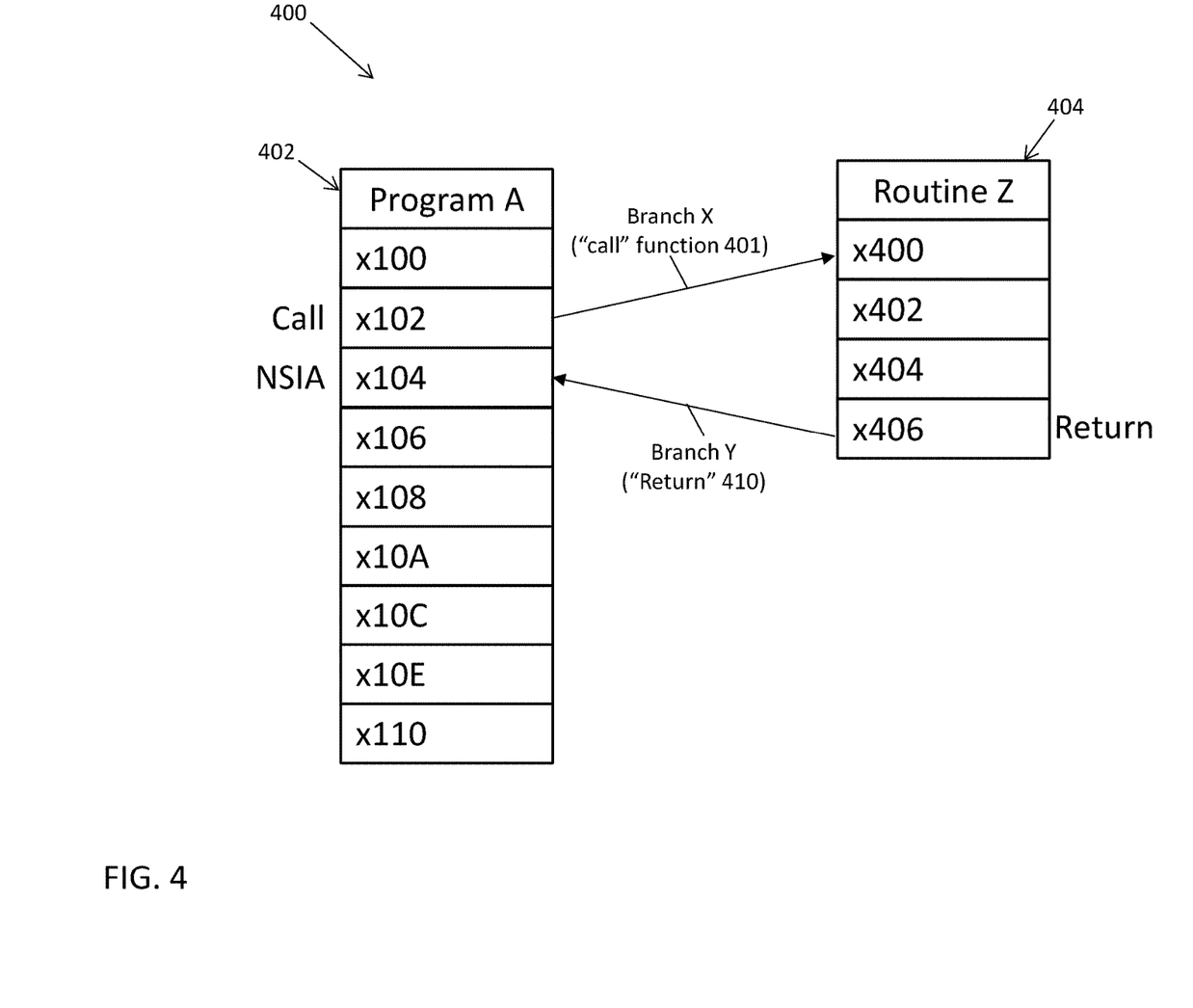
FIG. 4 illustrates an environment capable of implementing a branch prediction and detection in a program according.

Turning now to FIG. 4 an example environment 400 implementing a branch detection in a program is illustrated. The environment 400 implements techniques as disclosed herein to detect and predict likely branch pairs that exhibit call-return characteristics. Although illustrated as a one-entry deep queue, the present techniques apply to stacks with depth larger than one. In a stack implementation, there could be multiple instances of NSIA registers and valid bits.

In particular, FIG. 4 illustrates the program 402 and a function 404. A target instruction address (IA) of Branch X (i.e., "call" function 401) occurs at a particular IA (e.g., x102) which is a distance D bytes away from Branch X's IA. If the distance D is greater than the distance threshold T, a next sequential instruction address (NSIA) (e.g., x104) after the IA for Branch X is saved. The target IA of a branch is a distance 'a' bytes away from the taken branch's IA. In this example, both the distance 'a' is less than a distance threshold T, and therefore, the completion_NSIA immediately following the call function Branch X is not replaced. The target of the taken branch does not match the NSIA (i.e., x104) following Branch X. However, the target of Branch Y (i.e., "return" function 410 with IA x104) does match the NSIA immediately following Branch X. This indicates a likely call-return pair.

Figure 5:
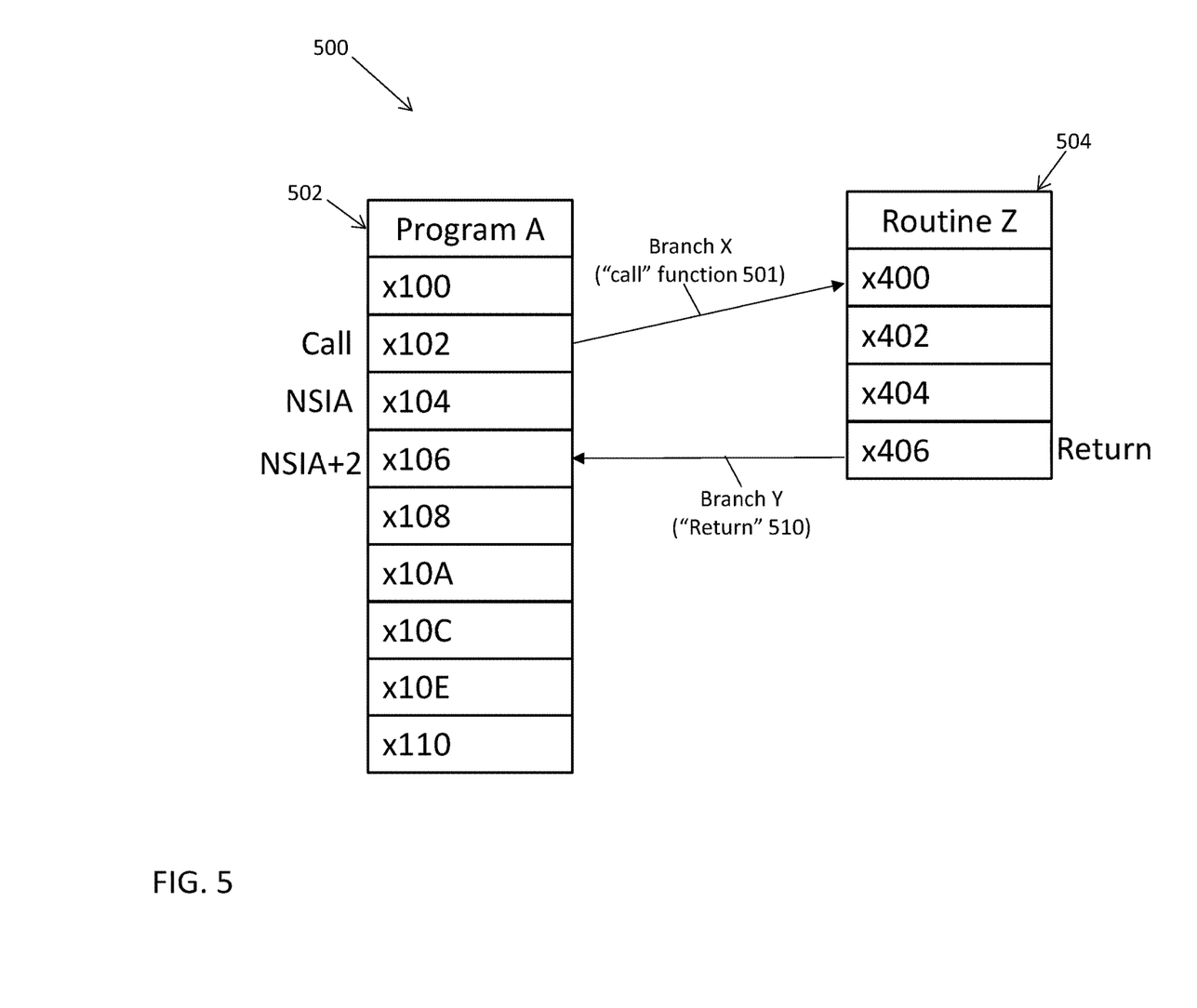
FIG. 5; illustrates an environment capable of implementing call/return stack target branch predictions to multiple next sequential instruction addresses according to a non-limiting embodiment.

Turning to FIG. 5, an environment 500 capable of implementing call/return stack target branch predictions to multiple next sequential instruction addresses according to a non-limiting embodiment. The environment 500 allows for both detecting a possible return capable branch, along with predicting multiple sequential instructions addresses (i.e., an offset NSIA) of a return capable branch.

In terms of detecting a possible return capable branch, for example, a program 502 includes a Branch X 501 that completes at address x102. Accordingly, the branch detection module 250 compares the distance (D) between Branch X's IA (e.g., x102) and its target IA (e.g., x400). The distance (D) can be a byte differential between Branch X's IA (e.g., x102) and its target IA (e.g., x400). In this example, the distance between x102 and x400 exceeds the distance threshold (Th). Therefore, the branch detection module 250 determines that Branch X 501 is a possible caller branch. Accordingly, the branch detection module 250 saves the NSIA (e.g., x104) of Branch X 501 in the call-return stack (CRS) and the bit corresponding to the x104 is marked as valid.

The routine 502 is then executed and encounters another branch (Branch Y 510) at address x406, which is determined as a possible return capable branch. The branch detection module 250 then confirms that the completion NSIA is valid, and proceeds to check the target IA of the branch at address x406 to determine whether it matches the NSIA (e.g., x104) stored in the CRS. In this example, the target IA at address x406 does not match the NSIA (e.g., x104), but does match an offset of the NSIA (e.g., x106). Accordingly, the branch detection module 250 updates the branch prediction logic (BPL) table(s) to indicate that Branch Y 510 at routine address x406 is a possible return capable branch with an offset NSIA (e.g., NSIA plus 2 not, i.e., x106).

In terms of predicting multiple sequential instructions addresses (i.e., an offset NSIA) of a taken branch, the branch prediction module 252 searches one or more BPL tables to detect a taken branch. In this example, the branch prediction module 252 identifies call Branch X 501 at address x102, and predicts its target IA (e.g., x400 in routine Z 504). The branch prediction module 252 then compares the distance (D) between Branch X's IA (e.g., x102) and its predicted target IA (e.g., x400). In this example, the difference between x102 and x400 exceeds the distance threshold (Th). Therefore, the NSIA (e.g., x104) of call Branch X 501 is saved in the call-return stack (CRS).

The routine 502 is then executed and encounters another taken branch (Branch Y 510) at address x406. In response to detecting Branch Y 510 at address x406, the branch prediction module 252 checks the BPL table(s) and determines that the taken branch at address x406 was previously identified (i.e., by the branch detection module) as a possible return capable branch. The branch prediction module 252 also determines in this example that the prediction NSIA register is valid. Accordingly, the branch prediction module 252 determines that it can use its CRS, and proceeds to determine which offset value (if any) should be added to the NSIA value (e.g., x104) previously stored in the CRS. In this example, the metadata included with the called Branch X 501 would indicate from the previously described detection operation that the offset is 2 bytes. Accordingly, the branch prediction module 252 adds 2 bytes to the initial NSIA value (x104) to predict that the target IA of the return Branch Y 510 at routine address x406 is x106 (i.e., x104+2).

Additional details of the branch detection and prediction are disclosed below with reference to FIGS. 6 and 7, respectively. Additional processes also may be included, and it should be understood that the processes depicted in FIGS. 6 and 7 represent illustrations, and that other processes may be added or existing processes may be removed, modified, or rearranged without departing from the scope and spirit of the present disclosure.

Figure 6:
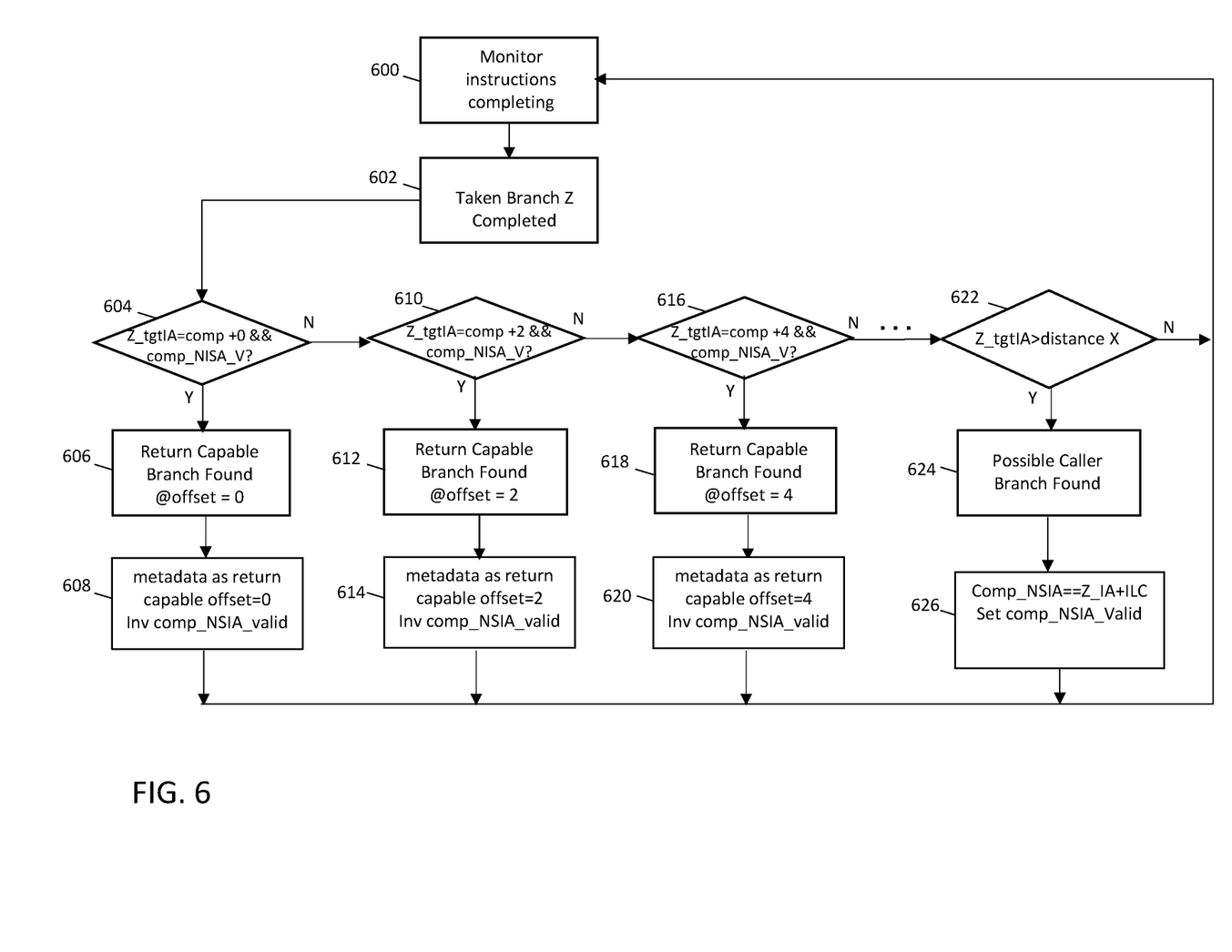
FIG. 6 illustrates a flow diagram of a method for branch detection and prediction according to examples of the present disclosure.
Figure 7:
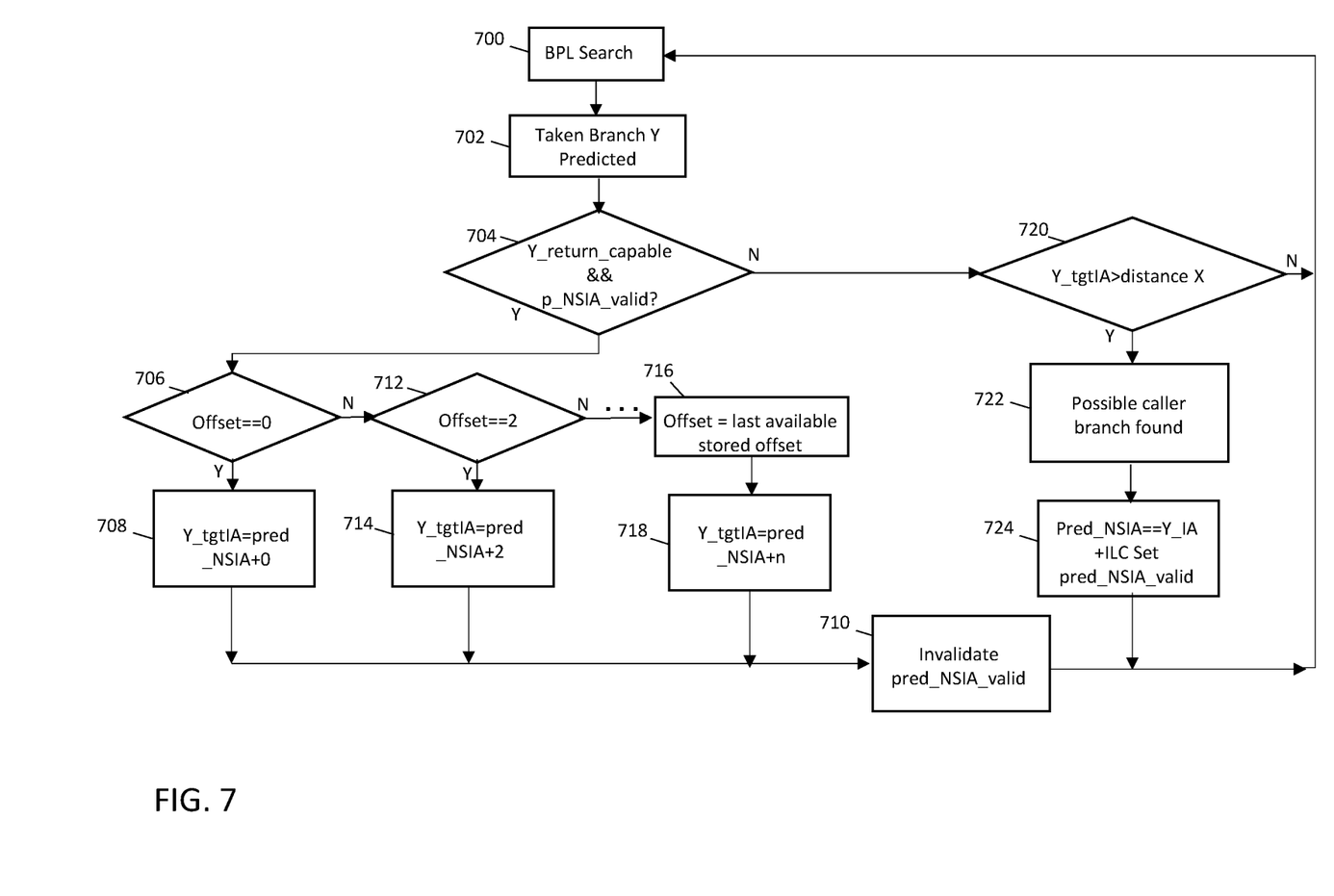
FIG. 7 illustrates a flow diagram of a method for branch detection according to examples of the present disclosure.

FIG. 6 illustrates a flow diagram of a method for branch detection according to examples of the present disclosure. The method begins at block 600 by monitoring instructions executed by the system. At block 602, the system detects that a branch was taken (e.g., Branch Z) and is completed. At decision block 604, it is determined whether (A) the taken branch's (Branch Z) target IA (Z_tgIA) is equal to the value stored in completion_NSIA register with no offset (i.e., comp_NSIA+0) and (B) whether the completion NSIA register is valid (i.e., whether a potential return is found). When it is determined that the taken branch's (Branch Z) target IA (Z_tgIA) is equal to the value stored in completion_NSIA register with no offset (i.e., comp_NSIA+0), and the completion NSIA register is valid (i.e., whether a potential return is found), a return capable branch is found at the register with no offset (i.e., offset=0) at block 606. Accordingly, at block 608 Branch Z is marked as return capable, and the completion_NSIA register with no offset (i.e., comp_NSIA+0) is set as invalid. Marking Branch Z as return capable may include marking Branch Z's metadata as return capable, for example, in a branch prediction logic (BPL) table. The method can then return to block 600 to continue monitoring additional instructions, or in other examples can terminate.

When, however, at decision block 604 it is determined that Branch Z's target IA is not equal to the value stored in the comp_NSIA+0 register and/or it is determined that the comp_NSIA+0 register is invalid, the method proceeds to compare the target IA against all remaining offset comp_NSIA registers (i.e., comp_NSIA+2, comp_NSIA+4, comp_NSIA+n. For instance, at decision block 610 a determination is made as to whether (A) the taken branch's (Branch Z) target IA (Z_tgIA) is equal to the value stored in completion_NSIA register with an offset (e.g., comp_NSIA+2) and (B) whether the completion NSIA register is valid (i.e., whether a potential return is found). When it is determined that the taken branch's (Branch Z) target IA (Z_tgIA) is equal to the value stored in completion_NSIA register with the offset (e.g., comp_NSIA+2), and the completion NSIA register is valid, a return capable branch is found at the register with the offset (e.g., offset=2) at block 612. The system, therefore, determines that a return capable branch is found at the current analyzed offset (e.g., offset=2). In other words, the system determines that the Branch Z's target is the NSIA plus two bytes (i.e., NSIA+2). Accordingly, at block 614 Branch Z is marked as return capable, and the completion_NSIA register with the offset (e.g., comp_NSIA+2) is set as invalid. The method can then return to block 600 to continue monitoring additional instructions, or in other examples can terminate.

When, however, at decision block 610 it is determined that Branch Z's target IA is not equal to the value stored in the offset comp_NSIA+2 register and/or it is determined that the comp_NSIA+2 register is invalid, the method proceeds to compare the target IA against the next offset comp_NSIA register (e.g., comp_NSIA+4). For instance, at block 616 a determination is made as to whether (A) the taken branch's (Branch Z) target IA (Z_tgIA) is equal to the value stored in the next offset completion_NSIA register (e.g., comp_NSIA+4) and (B) whether the completion NSIA register is valid (i.e., whether a potential return is found). When it is determined that the taken branch's (Branch Z) target IA (Z_tgIA) is equal to the value stored in the next offset completion_NSIA register (e.g., comp_NSIA+4), and the completion NSIA register is valid, a return capable branch is found at the register with the next offset (e.g., offset=4) at block 618. Accordingly, at block 620 Branch Z is marked as return capable, and the completion_NSIA register with the next offset (e.g., comp_NSIA+4) is set as invalid. The method can then return to block 600 to continue monitoring additional instructions, or in other examples can terminate Assuming in this example that comp_NSIA+4 is the last offset completion register, when the Branch Z's target IA is determined not to equal the last offset completion_NSIA register (e.g., comp_NSIA+4) at operation 616, the target IA for Branch Z (Z_tgIA) is compared to a threshold distance (X) at operation 622. When the target IA for Branch Z is not greater than the threshold distance away from Branch Z's IA, the method returns to operation 600 and continues monitoring instructions. Otherwise, when the target IA for Branch Z is greater than the threshold distance away from Branch Z's IA, a possible caller branch is identified at block 624. It should be appreciated that, in examples, the distance (X) between the target IA and Branch Z's IA is determined using an absolute value function. Accordingly, at operation 626 comp_NSIA is set equal to Branch Z's IA (Z_IA) with an added instruction length code (ILC) (e.g., 2 bytes, 4 bytes, 6 bytes, 8 bytes, etc.), and the comp_NSIA is set as valid. Utilizing the ILC allows for computing the actual NSIA. The method can then return to block 600 and continue monitoring additional instructions, or in other examples can terminate.

Additional processes also may be included, and it should be understood that the processes depicted in FIGS. 6 and 7 represent illustrations, and that other processes may be added or existing processes may be removed, modified, or rearranged without departing from the scope and spirit of the present disclosure.

FIG. 7 illustrates a method of performing branch prediction according to examples of the present disclosure. The method begins by performing a branch prediction logic (BPL) search (e.g., searching one or more BPL tables) at block 700. At block 702, a taken branch (e.g., Branch Y) is predicted. At decision block 704, the metadata of the taken branch (e.g., Branch Y) is analyzed to determine whether Branch Y is return capable and whether a predicted_NSIA side register is valid. If so, the system determines that the current taken branch is return capable, and proceeds to determine the target IA (i.e., NSIa+0 bytes, NCIS+2 bytes, NSIA+4 bytes, etc.) that matches the current taken Branch.

For instance, at operation 706, the system determines whether taken Brach Y matches the NCIS with no offset (i.e., offset=0). When a match is found (i.e., offset=0), the predicted_NSIA side register is set as the target IA for Branch Y (Y_tgIA) at operation 708, and the corresponding predicted NSIA side register with no offset (pred_NSIA+0) is set as invalid at block 710. Accordingly, the method can return to operation 700 and search the BPL, or in other examples can terminate.

However, no match is found (i.e., offset does not equal zero) at block 706, the method determines whether the return address is an offset of the NSIA, i.e., whether the return IA is offset from the NSIA by 2 bytes, 4 bytes, 6 bytes . . . n bytes. For instance, the method proceeds to block 712 to determine whether the NSIA is offset by 2 bytes (i.e., whether the offset=2). When the offset=2, the predicted_NSIA side register is set as the target IA for Branch Y (Y_tgIA) at block 714, and the corresponding predicted NSIA side register with an offset (pred_NSIA+2) is set as invalid at block 710. Accordingly, the method can return to block 700 and search the BPL, or in other examples can terminate. Otherwise, the method proceeds to block 716.

At block 716, the method determines that the offset is the last available stored offset because the BTB tables store only a fixed number of NSIA offsets: +0, +2 bytes, +4 bytes, +6 bytes, +8 bytes . . . +n bytes. When block 716 is reached after the BTB indicates the branch is a return-type branch and the pred_NSIA register is valid, and the method has moved past the second from the last NSIA offset byte, then it is determined that the offset is the last available stored offset. At operation 718, the predicted_NSIA side register is set as the target IA for Branch Y (Y_tgIA) at block 718, and the corresponding predicted NSIA side register with the last stored offset (pred_NSIA+n) is set as invalid at block 710. Accordingly, the method can return to block 700 and search the BPL, or in other examples can terminate.

When, however, at decision block 704 the metadata of Branch Y does not indicate that it is return capable and/or that the predicted_NSIA side register is valid, the method proceeds to block 720. At block 720, a determination is made as to whether the target IA for Branch Y (Y_tgIA) is greater than a threshold distance (X) away from Branch Y's IA. When Y_tgIA is not greater than the threshold distance (X), the method returns to search the BPL at block 700.

However, when Y_tgIA is greater than the threshold distance (X), a possible caller branch is found at block 722. It should be appreciated that, in examples, the distance (X) between the target IA and Branch Y's IA is determined using an absolute value function. Accordingly, at operation 724 pred_NSIA is set equal to Branch Y's IA (Y_IA) with an added instruction length code (ILC) (e.g., 2 bytes, 4 bytes, 6 bytes, 8 bytes, etc.), and the pred_NSIA is set as valid. In one or more embodiments, the return capable branch uses the predicted_NSIA side register's value if the predicted branch had previously taken a wrong target (i.e., in a previous prediction, the same branch's target IA was incorrect). The method can then return to block 600 and continue monitoring additional instructions, or in other examples can terminate.

In addition to typical metadata stored in each branch prediction entry, such as a branch direction history, etc., each branch stored also saves its instruction length code, indicating the length of the instruction (e.g., in bytes). This may not be necessary for some architectures with fixed instruction lengths or configurations where the branch is represented in the branch prediction entry by its ending instruction address—for example the last byte address of the instruction.

Additional processes also may be included, and it should be understood that the processes depicted in figures described herein. Other processes may also be added or existing processes may be removed, modified, or rearranged without departing from the scope and spirit of the present disclosure.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer data processing system comprising:
   a branch detection module configured to determine a first program including a first program branch that is a possible call branch preceding a next sequential instruction address (NSIA) included in the first program, and to determine a first routine including a first routine branch and to determine the first routine branch is a possible return capable branch, the first routine branch located at a first routine instruction address included in the first routine and having a target instruction address included in the first program that is detected as being offset within a defined range of allowed offsets from the NSIA; and
   a branch predictor module configured to determine the first program includes a second program branch that is a possible call branch having a NSIA included in the first program, and to determine the first routine includes a second routine branch that is a predicted return branch having a predicted target instruction address included in the first program based on the NSIA of the second program branch and the offset.

2. The computer data processing system of claim 1, wherein the branch predictor module detects a second program branch that is a possible call branch, and determines the predicted target instruction address of the second routine branch based on the NSIA of the first program branch and metadata included with the second program branch.

3. The computer data processing system of claim 2, wherein the predicted target instruction address of the second routine branch is an offset with respect to the NSIA.

4. The computer data processing system of claim 3, wherein the offset includes at least one byte that is added to the NSIA.

5. The computer data processing system of claim 4, wherein the branch detection module determines the NSIA as a next sequential instruction address immediately following a program instruction address of the first program branch.

6. The computer data processing system of claim 1, wherein determining the first program branch is a possible call branch having a next sequential instruction address (NSIA) is based on a comparison of a distance between a first target instruction address of the first program branch and a first instruction address of the first program branch against a distance threshold value, and wherein the branch detection module determines the possible call branch in response to the distance being greater than the distance threshold value.

7. The computer data processing system of claim 4, wherein the metadata indicates the at least one byte defining the offset.

8. A method of performing a branch prediction in a computer data processing system, the method comprising:
   determining, via a branch detection module, a first program including a first program branch that is a possible call branch preceding a next sequential instruction address (NSIA) included in the first program;
   determining, via the branch detection module, a first routine including a first routine branch, and determining the first routine branch is a possible return capable branch, the first routine branch located at a first routine instruction address included in the first routine and having a target instruction address included in the first program that is detected as being offset within a defined range of allowed offsets from the NSIA; and
   determining, via a branch predictor module, the first program includes a second program branch that is a possible call branch having a NSIA included in the first program; and
   determining, via the branch predictor module, the first routine includes a second routine branch that is a predicted return branch having a predicted target instruction address included in the first program based on the NSIA of the second program branch and the predicted offset.

9. The method of claim 8, further comprising determining the predicted target instruction address of the second routine branch based on the NSIA of the first program branch and metadata included with the second program branch.

10. The method of claim 9, further comprising calculating the predicted target instruction address of the second routine branch as an offset with respect to the NSIA.

11. The method of claim 10, wherein the offset includes at least one byte that is added to the NSIA.

12. The method of claim 11, further comprising determining, via the branch detection module, the NSIA as a next sequential instruction address immediately following a program instruction address of the first program branch.

13. The method of claim 8, further comprising:
comparing a distance between a first target instruction address of the first program branch and a first instruction address of the first program branch against a distance threshold value; and
determining, via the branch detection module, the possible call branch has a next sequential instruction address (NSIA) in response to the distance being greater than the distance threshold value.

14. The method of claim 11, further comprising using the metadata to indicate the at least one byte defining the offset.

15. A computer program product to control an electronic device to perform a branch prediction in a computer data processing system, the computer program product comprising a non-transitory computer readable storage medium having program instructions embodied therewith, the program instructions executable by an electronic computer processor to control the electronic device to perform operations comprising:
determining, via a branch detection module, a first program including a first program branch that is a possible call branch preceding a next sequential instruction address (NSIA) included in the first program;
determining, via the branch detection module, a first routine including a first routine branch, and determining the first routine branch is a possible return capable branch, the first routine branch located at a first routine instruction address included in the first routine and having a target instruction address included in the first program that is detected as being offset within a defined range of allowed offsets from the NSIA; and
determining, via a branch predictor module, that the first program includes a second program branch that is a possible call branch having a NSIA included in the first program; and
determining, via the branch predictor module, that the first routine includes a second routine branch that is a predicted return branch having a predicted target instruction address included in the first program based on the NSIA of the second program branch and the predicted offset.

16. The computer program product of claim 15, wherein the operations further comprise determining the predicted target instruction address of the second routine branch based on the NSIA of the first program branch and metadata included with the second program branch.

17. The computer program product of claim 16, wherein the operations further comprise calculating the predicted target instruction address of the second routine branch as an offset with respect to the NSIA.

18. The computer program product of claim 17, wherein the offset includes at least one byte that is added to the NSIA.

19. The computer program product of claim 18, wherein the operations further comprise determining, via the branch detection module, the NSIA as a next sequential instruction address immediately following a program instruction address of the first program branch.

20. The computer program product of claim 15, wherein the operations further comprise:
comparing a distance between a first target instruction address of the first program branch and a first instruction address of the first program branch against a distance threshold value; and
determining, via the branch detection module, the possible call branch in response to the distance being greater than the distance threshold value.

* * * * *